Jan. 3, 1928.
L. W. CHUBB
1,654,576
WAVE DEVIATION METER
Filed June 6, 1924
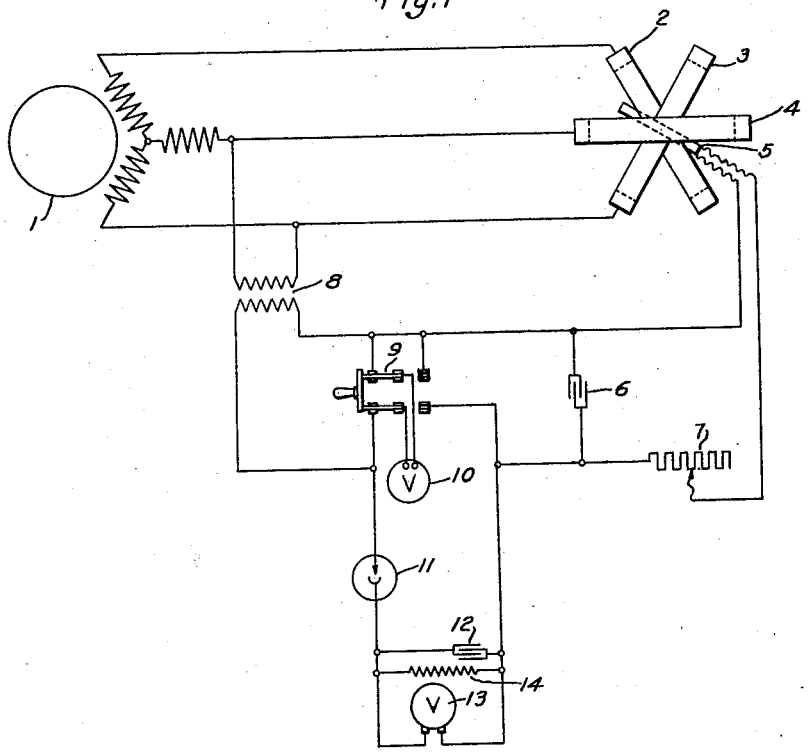
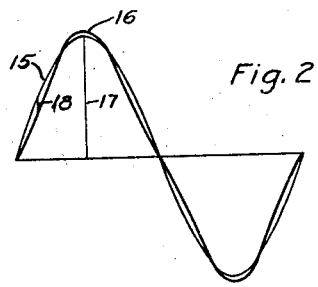
INVENTOR
Lewis W. Chubb Patented Jan. 3, 1928.

1,654,576

UNITED STATES PATENT OFFICE.

LEWIS W. CHUBB, OF EDGEWOOD, PENNSYLVANIA, ASSIGNOR TO WESTINGHOUSE ELECTRIC & MANUFACTURING COMPANY, A CORPORATION OF PENNSYLVANIA.

WAVE-DEVIATION METER.

Application filed June 6, 1924. Serial No. 718,240.

My invention relates to a method of and means for testing electrical apparatus and, more particularly, to the determination of the deviation of alternating-current equipment from the theoretical or true sine-wave characteristics.

The object of my invention is to provide an improved method and apparatus for determining the deviation factor of non-sinusoidal voltages.

It is impracticable, from the standpoint of cost, to construct commercial alternators which will generate a true sine wave of voltage. The deviation of the wave form of the generated voltage from the true sine wave sometimes produces undersirable results and, accordingly, should be overcome to as large an extent as possible.

In order to limit the deviation of non-sinusoidal voltages from the sine wave, it is usual to specify the maximum allowable deviation factor. This deviation factor is defined as the ratio of the maximum difference between corresponding ordinates of the generated wave and of the equivalent sine wave to the maximum ordinate of the equivalent sine wave when the waves are superposed in such a way as to make this maximum difference as small as possible. It is ordinarily specified that the deviation factor shall not exceed a certain percentage,—for instance, ten percent.

Heretofore, the deviation factor has been determined by computation and measurement from an oscillograph of the voltage wave in question. This method was laborious and inaccurate as it required superposing a sine wave of the same root-mean-square value upon the oscillograph of the non-sinusoidal wave and then measuring with a scale the maximum difference between the ordinates of the two curves, under the condition of minimum maximum deviation.

In accordance with my invention, the maximum instantaneous difference of potential between the wave in question and a sine wave of the same frequency and root-mean-square value is measured directly. From this potential difference, the deviation factor may be readily obtained.

A source of sinusoidal voltage is provided, the phase and magnitude of the voltage being adjustable. This voltage is adjusted until the root-mean-square value is equal to that of the voltage being tested. The phase of the voltages is then shifted until they are in opposite phase, and the maximum instantaneous difference of potential at this time is measured directly by a suitable indicating instrument.

Referring to the accompanying drawings wherein I have illustrated a preferred form of the invention, Figure 1 is a diagrammatic view of the apparatus for measuring the deviation factor of a wave, and Fig. 2 is a diagram of curves representing superposed sinusoidal and non-sinusoidal waves from which the definition of the deviation factor will be obvious.

Referring to Fig. 2, curve 15 represents a true sine wave and curve 16 is a non-sinusoidal wave having the same root-mean-square value and superposed upon curve 15 so that the maximum difference between any of the corresponding ordinates of the two waves is a minimum. We have seen that the deviation factor of the wave 16 is the ratio of the maximum difference between corresponding ordinates of waves 15 and 16 and the maximum ordinate 17 of the sine wave 15, assuming that waves 15 and 16 are so superposed as to make this maximum difference as small as possible. Thus, if the line 18 represents the maximum difference between the ordinates of waves 15 and 16, the ratio of the values represented by the lines 18 and 17 is the deviation factor and this must not exceed a certain percentage which is ordinarily specified in the specifications of alternating-current equipment.

It is the object of my invention to provide apparatus for readily and accurately determining this maximum difference 18 from which the deviation factor may be easily computed since the maximum ordinate 17 of the sine wave is known.

Referring to Figure 1, 1 denotes an alternator generating a three-phase voltage of which the deviation factor is to be measured. Connected to the alternator 1 are coil windings 2, 3 and 4 arranged to produce a rotating field, in the well known manner. A fourth coil 5 is disposed within the windings 2, 3 and 4 and is suitably mounted so that it may be turned as required. The rotating field of the windings 2, 3 and 4 induces an alternating potential in the winding 5. A condenser 6 is connected in series with the winding 5. The capacity of the condenser 6 and the inductance of the coil 5 are of such magnitude that the circuit including these two elements is resonant at the frequency corresponding to that generated by the alternator 1, and this circuit is loosely coupled to the alternator. Accordingly, the voltage produced across the terminals of the condenser 6 is sinusoidal and of the same frequency as that of the alternator 1. A controlling resistor 7 in the resonant circuit permits the amplitude of the sinusoidal voltage to be adjusted as desired.

A voltage transformer 8 is connected across one phase of the alternator 1 to reduce the voltage to correspond to that across the condenser 6.

A switch 9 is arranged to connect an alternating-current-type voltmeter 10 to either the secondary winding of the voltage transformer 8 or to the terminals of the condenser 6. The voltmeter 10 indicates the root-mean-square value of the alternating voltage. The variable resistor 7 is adjusted until the root-mean-square value of the voltage across the condenser 6 is equal to the root-mean-square voltage across the secondary winding of the transformer 8.

In series with the condenser 6 and the secondary winding of the transformer 8 is a potential-measuring device comprising an asymmetric conducting device 11, a condenser 12 and a voltmeter 13. The voltmeter 13 may be a static voltmeter. It will be apparent that, when the current is in the proper direction in this circuit, the condenser 12 will be charged through the asymmetric conducting device 11 to a maximum potential equal to the difference between the instantaneous values of the voltages across the terminals of condenser 6 and of transformer 8. The voltmeter 13 indicates directly the potential to which the condenser 12 is charged. The position of the coil 5 is now varied until the deflection of the voltmeter 13 is a minimum. When this is done, the voltage across the condenser 6 will be in the required phase with the voltage across the transformer 8, as shown by the curves of waves 15 and 16 in Fig. 2, and the meter 13 reads the maximum difference of potential represented by the line 18, Fig. 2. A resistance 14, of the order of a megohm, is connected in shunt with the condenser 12 to provide a suitable leakage path for the condenser charge.

The maximum ordinate 17 of the sine wave is equal to $\sqrt{2}$ times the root-mean-square value indicated on the meter 10. Hence, the deviation factor which is the ratio of these two values 18 and 17 may be readily computed.

It will be apparent that the above described method of obtaining the deviation factor is rapid and accurate. By the use of this method, the laborious computations of the prior methods are avoided and greater accuracy is obtained.

I claim as my invention:

1. The method of determining the deviation factor of a non-sinusoidal voltage wave which comprises generating an equivalent sinusoidal voltage wave in deriving voltages of the same root-mean-square value from said waves and measuring the maximum instantaneous difference between said voltages.

2. The method of determining the deviation factor of a non-sinusoidal voltage wave which comprises generating an equivalent sinusoidal voltage wave, connecting the two voltages in opposition, shifting the phase relationship of the two voltage waves until the maximum instantaneous potential difference therebetween is a minimum, and then measuring this maximum instantaneous potential difference.

3. In combination, a source of periodic non-sinusoidal voltage, a source of sinusoidal voltage of the same frequency, means for connecting said sources in opposition, means for deriving voltages of the same root-mean-square value from said sources and means, including a crest-voltage-indicating device, for measuring the maximum instantaneous difference between said root-mean-square voltages.

4. In combination, a source of periodic non-sinusoidal voltage, a source of sinusoidal voltage of the same frequency, means for deriving voltages of the same root-mean-square value from said sources and means for directly measuring the maximum potential difference between said root-mean-square voltages.

5. A testing system comprising a source of periodic non-sinusoidal current, a resonant circuit tuned to the frequency of said periodic current and inductively coupled to said source, means for deriving voltages of the same root-mean-square value from said source and said resonant circuit, and means for measuring the maximum instantaneous potential difference between said voltages.

6. A testing system comprising an alternating-current generator, a resonant circuit tuned to the frequency of said generator, means for deriving voltages of the same frequency from said generator and said circuit, means for measuring instantaneous values of the differences of potential between said voltages, and means for varying the phase relationship between said voltages, as desired.

7. A testing system comprising an alternating-current generator, a resonant circuit tuned to the frequency of said generator and excited therefrom, means for deriving voltages of the same root-mean-square value from said generator and said circuit, means for varying the phase relationship of said voltages until the maximum difference of potential is a minimum, and means, including an indicating instrument, for measuring this maximum potential difference.

8. A testing system comprising a polyphase alternator, means, including a polyphase winding connected to said alternator, for producing a rotating field, a resonant circuit coupled to said winding and tuned to the frequency of said alternator, means for deriving a periodic voltage from one phase of said alternator, means for deriving an in-phase voltage of the same root-mean-square value from said resonant circuit, and means, including a crest voltage measuring device, for determining the maximum instantaneous difference of potential between said voltages.

9. In combination, a source of alternating current, means for deriving a voltage therefrom, means for producing an equivalent sinusoidal voltage, and means, including said last mentioned means, for determining the deviation factor of the first mentioned voltage.

10. In combination, a source of alternating current, means for deriving a voltage therefrom, means for producing an equivalent sinusoidal voltage, and means for determining the maximum difference between corresponding values of said voltages when they are so related so as to make this maximum difference a minimum.

In testimony whereof, I have hereunto subscribed my name this 21st day of May, 1924.

LEWIS W. CHUBB.